INVENTOR.
HANS R. ROTTMANN

United States Patent Office 3,439,178
Patented Apr. 15, 1969

3,439,178
RADIATION-SENSITIVE APPARATUS FOR INSPECTING WALL THICKNESS OF HOLLOW CONTAINERS
Hans R. Rottmann, Poughkeepsie, N.Y., assignor to Owens-Illinois, Inc., a corporation of Ohio
Filed Feb. 8, 1965, Ser. No. 430,796
Int. Cl. H01j 39/12
U.S. Cl. 250—222    5 Claims

ABSTRACT OF THE DISCLOSURE

The disclosure herein comprises a method and apparatus for inspecting hollow containers for wall thickness and distribution of material through the wall including a method and apparatus for diffusely illuminating the container through an exterior surface of the wall and inspecting a diametrically opposed portion of the container for variations in transmission therethrough. When the transmission through the opposed portion of the wall varies, this can be utilized to record the varying thickness or to compare the thickness with a predetermined standard and cause a reject signal if the thickness varies from the predetermined standard.

BACKGROUND OF THE INVENTION

Figure 1:
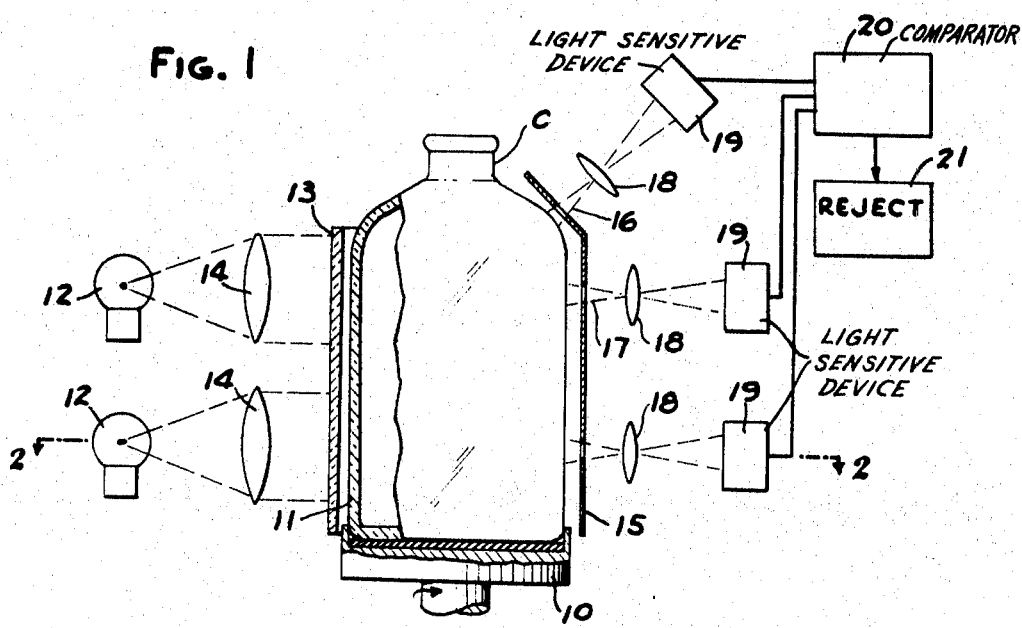

This invention relates to inspecting hollow containers such as glass containers and more particularly to inspecting such containers for wall thickness and distribution of material through the wall.

In the manufacture of hollow containers such as glass containers or containers made of translucent material, a defect that is occasionally present is that the distribution of the glass in the wall of the container varies and sometimes exceeds predetermined limits in which the container should be rejected. The problem of inspecting the thickness of the walls of such containers is extremely difficult especially where the container has a narrow neck or opening such that a probe or other device cannot be inserted in the container.

It is therefore an object of this invention to provide a method and apparatus for inspecting hollow containers for wall thickness and wall distribution without inserting a probe or the like through the open end of the container.

It is a further object of the invention to provide such a method and apparatus wherein the inspecting can be conducted without contacting the wall of the container.

SUMMARY

Basically, the invention comprises diffusely illuminating the container through a large portion of the exterior surface of the wall and inspecting a diametrically opposed small portion of the container for changes of wall thickness as they are correlated to variations in transmission therethrough. The transmission through the large portion of the wall remains practically constant since variations average out. This can be utilized to record the varying thickness of the small portion and cause a reject signal if the thickness variations exceed a predetermined value.

The total light flux which is incident upon any small area of the inside of the container which is substantially diametrically opposed to the large illuminated portion of the wall will, for all practical purposes, be constant even as the container rotates, since the local variations of transmission due to local changes of thickness will average out over the large illuminated area. The important point is that the flux emerging from the small area varies according to the changing wall thickness. There can be no averaging-out since the area of the wall which is being examined is quite small due to the aperture size of the mask 15. By examining a relatively small area, and utilizing the output of the photocell, a record of wall thickness variations may be taken or a reject signal may be provided when the thickness variations exceed a predetermined value. In other words, it is more important that the bottle wall have a substantially constant wall thickness throughout its circumference. Those bottles which are most likely to fail through usage, are those which have extreme variations in wall thickness above and below what would be considered a normal wall thickness. As would be expected, a container which has a thin area will normally have a correspondingly thick area opposite to the thin area due to the parison blowing technique which is utilized in producing glass containers.

Figure 2:
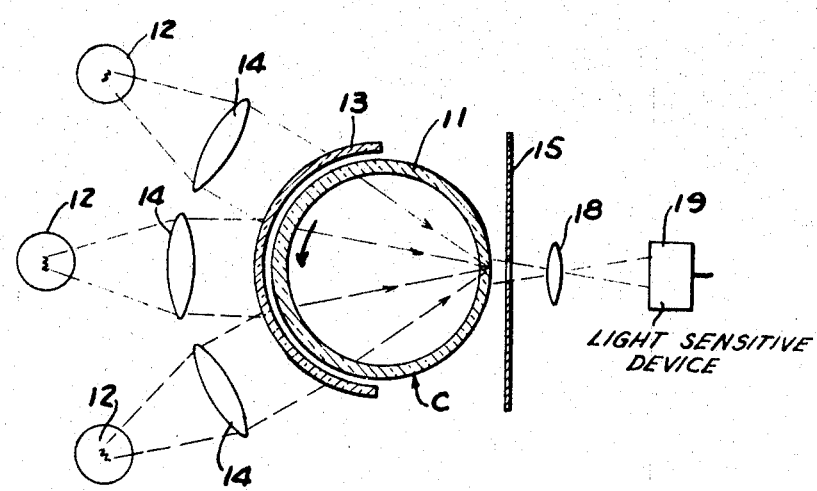

In the drawings:
FIG. 1 is a part sectional partly diagrammatic elevational view of an apparatus embodying the invention.
FIG. 2 is a sectional view taken along the line 2—2 in FIG. 1.

Referring to the drawings, a container C which is made of glass or other translucent material is supported for inspection on a pad 10 which is rotated to in turn rotate the container C about its axis.

In order to inspect the wall 11 of the container for variations in wall thickness or deviations of the wall thickness from a predetermined value, substantially one-half of the wall is illuminated by directing a plurality of light beams of radiant energy to which the container C is transparent from sources 12 against the exterior surface of a semi-cylindrical diffusing plate 13 that is made of light diffusing or scattering material such as translucent plastic. The light diffusing or scattering plate 13 is positioned in close proximity with the exterior wall 11 of the container C. The sources 12 are distributed vertically and horizontally to illuminate substantially all of the diffuser plate 13. The light from the sources 12 is preferably collimated by lenses 14.

An opaque mask 15 is positioned in diametrically opposed relation to the diffuser plate with portions thereof extending throughout the length of the portion of the wall 11 which is to be inspected. The mask is provided with apertures 16, 17, with the number of apertures corresponding to the number of positions circumferentially of the wall 11 which are to be inspected. A lens 18 is provided adjacent each aperture and is adapted to focus a reduced image of the translucent plate 13 on each light sensitive device 19, such as a silicon solar cell, which is sensitive to radiant energy from the sources 12. As shown in FIG. 1, three apertures are provided for viewing three portions of the wall.

In accordance with the invention, the provision of the light scattering plate 13 adjacent the wall 11 produces a strong and practically constant flux of radiation interiorly of the container C. The radiation passing through the apertures 16, 17 and incident on any of the light sensitive devices 19, however, will vary depending upon the wall thickness adjacent to said light sensitive devices. The varying energization of the light sensitive devices 19 can be utilized to provide a permanent recording of the variation of wall thickness or can be directed to an electronic circuit 20 where a reject signal is provided to energize a reject mechanism 21 if the thickness variations exceed a pre-established limit. The comparator 20 may be of the type shown in the patent to Politsch, 2,755,703.

Any thickness variations in the portion of the wall of the container C adjacent the light diffusing plate 13 do not affect the reading because of the averaging effect over this relatively large area, whereas such averaging effects cannot occur in the small areas adjacent to the apertures 16, 17. Therefore, it can readily be seen that the output of the photocells 19 will provide an accurate indication of the variations in wall thickness of the container as it is rotated past the apertures 16, 17. In one rotation of pad 10, the entire wall is inspected.

The method and apparatus disclosed herein is directed to measuring the wall distribution of the glass container while it is rotated in a specific vertical position, it should be obvious to those skilled in the art that inspection of the container could be provided by rotation thereof and bodily moving the container vertically at the same time to thus provide a helical scan of the entire side wall surface of the container, it being understood that the upper or shoulder observing light pick-up would be rendered inoperative until the container had reached its final upward position, as shown in FIG. 1, at which time a single rotation of the container would provide an accurate reading of the glass distribution and wall thickness of the shoulder portion of the container. It can thus be seen that there has been provided a method and apparatus for inspecting hollow containers for wall thickness and glass distribution without inserting a probe through the open end of the container.

I claim:

1. An apparatus for inspecting hollow containers for wall thickness which comprises
    means for diffusely illuminating a portion of the wall of the container,
    light sensitive means adjacent an exterior surface of a diametrically opposed portion of the wall of the container,
    comparator means for comparing the intensity of light on said light sensitive means with a predetermined standard and creating a signal in response to said variation,
    lens means interposed between the exterior wall of said container and said light sensitive means for focusing an image of said illuminated portion of said container on said light sensitive means.

2. An apparatus for inspecting hollow containers for wall thickness which comprises
    a diffuser plate mounted adjacent a wall portion of said container,
    light sources positioned adjacent thereto for directing light against said diffuser plate,
    light sensitive means adjacent an exterior surface of the diametrically opposed illuminated portion of the wall of the container,
    means for creating a signal in response to variations of light on said light sensitive means,
    and lens means interposed between the exterior wall of said container and said light sensitive means for focusing a reduced image of said illuminated portion of said container on said light sensitive means.

3. The combination set forth in claim 1 including apertured mask means interposed between the wall of said container and said light sensitive means for limiting the field of vision of said light sensitive means.

4. The combination set forth in claim 1 wherein said means for diffusely illuminating said wall portion comprises a diffuser plate mounted adjacent said wall portion and light sources positioned adjacent thereto for directing light against said diffuser plate.

5. An apparatus for inspecting hollow containers for wall thickness and glass distribution which comprises
    means for rotating said container about its axis,
    means for diffusely illuminating a portion of the wall of the container,
    a plurality of light sensitive means positioned adjacent an exterior surface of a diametrically opposed portion of the wall of the container with their lines of vision viewing isolated parts of said diametrically opposed portion,
    a lens means interposed between the exterior wall of said container and each said light sensitive means for focusing an image of said illuminated part of said diametrically opposed portion of said container on said light sensitive means,
    and means connected to said light sensitive means for measuring the intensity of light incident thereon, said means providing an output signal when the variations in light intensity falling on the light sensitive means are of a preset value and reject means responsive to said output signal.

References Cited

UNITED STATES PATENTS

| | | | |
|---|---|---|---|
| 2,593,127 | 4/1952 | Fedorchak | 88—14 |
| 2,755,703 | 7/1956 | Politsch et al. | 250—223 |
| 3,030,516 | 4/1962 | Seavey | 250—221 |
| 2,265,037 | 12/1941 | Gulliksen | 88—14 |
| 3,133,638 | 5/1964 | Calhoun | 209—82 |

WALTER STOLWEIN, *Primary Examiner.*

U.S. Cl. X.R.

88—14; 250—223